March 14, 1961 M. E. BIVENS ET AL 2,975,338
COLD CATHODE COUNTING TUBE SEQUENCE CONTROL SYSTEM
Filed Sept. 3, 1957 6 Sheets-Sheet 1

FIG. 1.

INVENTORS:
CARTER SINCLAIR,
MAURICE E. BIVENS, DECEASED,
LUCIENNE J. BIVENS, ADMINISTRATRIX,

BY Melvin M. Goldenberg
THEIR ATTORNEY.

INVENTORS:
CARTER SINCLAIR,
MAURICE E. BIVENS, DECEASED,
LUCIENNE J. BIVENS, ADMINISTRATRIX,
BY *Melvin M. Goldenberg*
THEIR ATTORNEY.

INVENTORS:
CARTER SINCLAIR,
MAURICE E. BIVENS, DECEASED,
LUCIENNE J. BIVENS, ADMINISTRATRIX,

BY *Melvin M. Goldenberg*

THEIR ATTORNEY.

March 14, 1961 M. E. BIVENS ET AL 2,975,338
COLD CATHODE COUNTING TUBE SEQUENCE CONTROL SYSTEM
Filed Sept. 3, 1957 6 Sheets-Sheet 5

INVENTORS:
CARTER SINCLAIR,
MAURICE E. BIVENS, DECEASED,
LUCIENNE J. BIVENS, ADMINISTRATRIX,

BY *Melvin M. Goldenberg*
THEIR ATTORNEY.

United States Patent Office 2,975,338
Patented Mar. 14, 1961

2,975,338

COLD CATHODE COUNTING TUBE SEQUENCE CONTROL SYSTEM

Maurice E. Bivens, deceased, late of Waynesboro, Va., by Lucienne J. Bivens, administratrix, Schenectady, N.Y., and Carter Sinclair, Waynesboro, Va., assignors to General Electric Company, a corporation of New York Filed Sept. 3, 1957, Ser. No. 681,712

15 Claims. (Cl. 317—149)

This invention relates to a novel device for controlling a series of functions and their time. More specifically, the invention relates to a device utilizing multi-cathode electric valves and a series of relays constituting a relay train to control a sequence of operations and the time of each operation in the sequence.

An object of this invention is to provide a novel device for programming a series of functions and their time in a sequence of such functions utilizing multi-cathode electric valves to perform the timing function.

It is another object of this invention to provide a novel device for programming a series of functions and timing each function in a sequence of such functions using one or more multi-cathode electric valves so that each function may be timed in terms of a number of cycles of a supply frequency.

It is still another object of this invention to provide a novel device for performing reliable and accurate timing of a series of functions in a sequence of operations wherein the time for each function may be predetermined over a wide interval by the setting of mechanical switch means.

It is a still further object of this invention to provide a novel sequencing panel for use in conjunction with resistance welding machines in which multi-cathode electron valves are utilized to determine the time of each function in a welding sequence.

Briefly, in one embodiment of our invention we provide multi-cathode electron valves and means to establish initial conduction from a preselected one of the cathodes thereof together with means to transfer conduction at a predetermined rate from one cathode to another and sequencing means operated by the signal developed by the conduction of a selected one of the cathodes. Our invention also contemplates the provision of means for repetitively effecting one or more of the timed functions in the sequence of functions as a part of the program controlled by the system.

The subject matter which we regard as our invention is particularly pointed out and distinctly claimed in the concluding portion of this specification. Our invention, however, both as to its organization and method of operation together with further objects and advantages thereof may best be understood by reference to the following description taken in connection with the accompanying drawing in which:

The invention to be described in detail hereinafter is a device for controlling each function in a sequence of such functions and for timing the duration of each of the functions. It is obvious that such a device may find application in many areas, particularly in industrial operations wherein it is desired to provide extreme accuracy and reliability for a control of this nature. A particular example of such an industrial operation which contains a sequence of steps or functions each of which must be precisely timed is the resistance welding of metallic materials. In resistance welding control systems, a number of load circuits or devices require energization in a predetermined sequence in order to effect the complete welding cycle of:

(1) Moving the electrodes into forceful engagement with the metal to be welded during a time interval known as the "squeeze" time before initiating the flow of welding current, (2) Passing a heavy current of electricity through the metal for a predetermined interval of time known as the "weld" time, (3) Maintaining the solenoid valve energized for an interval of time known as the "hold" time after the termination of the welding current to hold the electrodes in forceful engagement with the metal until a homogenous weld is formed, and (4) Separating the welding electrodes and maintaining them separated for a predetermined interval of time known as the "off" time before they are again moved into work engagement position.

As is well known, a resistance welding operation may also call for other functions such as a preheating period prior to the "weld" during which current less than the current necessary to effect a weld is passed through the metal, and a postheating period during which a current less than a welding current is passed through the metal after the welding function has been effected. Also it may be desired during the weld time to provide a predetermined number of welding impulses, then a predetermined period during which no welding current is applied and termed the "cool" time. During such a welded period, several periods of alternate heat and cool may be supplied. Other functions are also prevalent in this particular industrial operation and a sequence timer may be called upon to effect these also. As will be explained below, the invention may be adapted in order to control and time these other functions.

Figure 1:
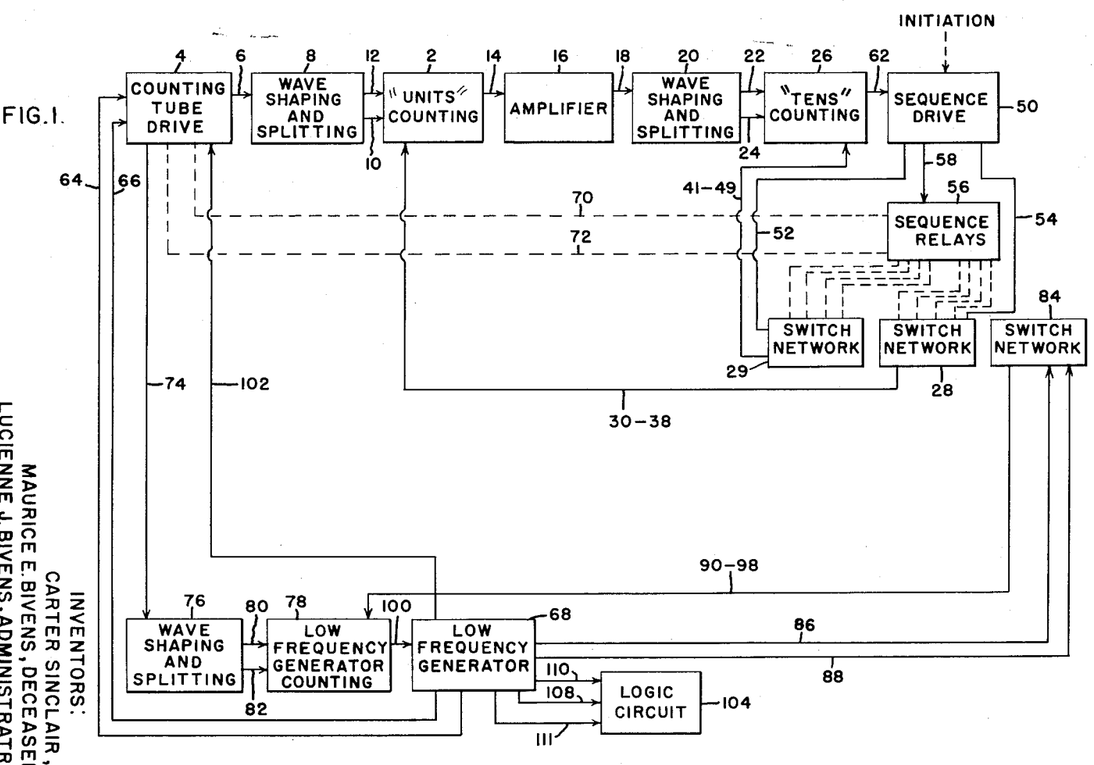
Fig. 1 is a block diagram of a form of the invention embodied in a timing and sequence control system.

Fig. 1 of the drawing illustrates an embodiment of the invention which provides a "units" counting unit 2. The units counting unit 2, as may be seen in Fig. 2 of the drawing, is constituted by a multi-cathode electron valve.

This valve is a gas-filled cold cathode type of tube. Its structure and operation will be explained in greater detail hereinafter, but generally it operates so that conduction is transferred from cathode to cathode in a sequential manner and, in the form of the invention illustrated in Fig. 1, this is accomplished by the use of a counting unit drive 4 which ordinarily supplies an output via the conductor 6 in the form of a pulse to a wave shaping and splitting circuit 8. The wave shaping and splitting circuit 8 provides two negative-going pulses having a phase displaced relationship to each other over the conductors 10 and 12 to the counting unit 2 to effect the sequential transfer of conduction referred to above. Conduction is initiated at a predetermined one of the cathodes of the counting tube 2 and continues until another predetermined cathode in the counting tube begins to conduct. At this time, a pulse is provided over the conductor 14 to an amplifier 16. The amplifier 16 is connected by a conductor 18 to a second wave shaping and splitting circuit 20. The output of the amplifier 16 is a negative-going pulse similar to the output pulse of the counting tube drive 4 and is formed by the wave shaping and splitting circuit 20 into two negative-going pulses having a phase displaced relationship to each other which are coupled by a pair of conductors 22 and 24 to a "tens" counting unit 26. Thus as the units counter 2 counts when driven by the counting tube drive 4, it may be operated in such a manner as to count from one to nine and upon commencing to count over nine (to repeat), will furnish a driving pulse to cause the tens counting unit 26 to transfer conduction from one cathode to the next one in sequence in order that the tens may be counted. In the arrangement shown, counts from one to one hundred may be achieved and if the counting unit drive 4 is provided to furnish a counting pulse in accordance with a line frequency, which in the case of conventional industrial applications takes the form of a sixty cycle alternating current supply, it may be seen that the device will count from one to one hundred cycles of such a sixty cycle supply. It is obvious that if higher counts are desired, additional counting tubes may be provided following the tens counting unit 26 and amplifiers and wave shaping and splitting networks such as shown at 16 and 20 respectively provided in order to drive such counting tubes.

In this form of the invention, timing, since the units 2 and 26 count cycles of standard line frequency which therefore may be translated into time, is determined by the setting of a pair of switch networks 28 and 29. The switch networks 28 and 29, as will be explained in connection with Figs. 5 and 6 hereinafter, provide a lead for each of the cathodes of the counting tubes in the counting units 2 and 26 and junction to complete a circuit with a selected one of the leads to have conduction initiated at that particular lead. Thus in Fig. 1 the switch network 28 is provided with a plurality of leads 30 to 38 connected to the units counting unit 2 and the switch network 29 has its leads 41 to 49 connected to the tens counting unit 26. The leads 30–38 and 41–49 are shown in Fig. 1 as a single lead in each case for the sake of clarity in the drawing. To start conduction at a predetermined one of the cathodes in the counting units 2 or 26, a conduction initiation or reset pulse is delivered from a sequence drive device 50 via a conductor 52 to the switch network 29 and via a conductor 54 to the switch network 28. The switch networks 28 and 29 include separate switching means for each of the functions to be timed and the particular switching means rendered effective to deliver the reset pulse from the sequence drive device 50 is selected by the operation of one of a group of sequence relays 56 which are actuated in a sequential manner by signals from the sequence drive device 50 via a conductor 58.

The sequence drive device 50 also includes means for the initiation of the operation of the system and means for receiving a signal via a conductor 62 from the tens counting unit 26 which indicates that a particular function has been completed or timed out so that the signal to the sequence relays 56 and the initial conducting or reset pulse to the counting units 2 and 26 will be developed.

The counting unit drive 4 receives a signal to effect its operation via the conductors 64 and 66 from a low frequency generator 68 and, as explained above, will ordinarily drive the units counting unit 2. However, when it is desired to count something other than line frequency, as when impulses of low frequency current are being generated and a preselected number of them is desired, means in the counting unit drive 4 operated by portions of the sequence relays 56 as indicated by the dotted lines 70 and 72 will furnish its driving output via the conductor 74 to a wave shaping and splitting circuit 76 to drive a low frequency generator counting unit 78 via the conductors 80 and 82. The low frequency generator counting unit 78 is of the same type as the units and tens counting units 2 and 26. The time is predetermined by a switch network 84 which is effective to control the time of what may be termed two sub-functions if the functions termed by the units 2 and 26 are designated as primary functions and receive an initiating or reset pulse from the low frequency generator 68 via a pair of conductors 86 and 88. The reset pulse is directed to the low frequency generator counting unit 78 over one of a plurality of conductors 90 to 98 which are shown for the sake of simplicity in the drawing as a single conductor in Fig. 1. Upon the completion of the timing of a given sub-function by the low frequency generator counting unit 78, a pulse is supplied via a conductor 100 to the low frequency generator 68 in order that it may supply the reset pulse via the conductor 86 or 88 through the switch network 84 to commence the timing of another sub-function. The low frequency generator also is effective at the completion of the timing of two sub-functions to supply a pulse via a conductor 102 to the counting unit drive 4 in order to drive the units counting unit 2. Thus when the counting unit drive 4 is effective to drive the low frequency generator counting unit 78, it will control and time two sub-functions of a primary function in the sequence and at the completion of each two sub-functions, the units counting unit 2 will be driven by a signal from the low frequency generator 68. In response to this signal, the units counting units 2 and 26 will now count at a lower frequency than the line frequency, which lower frequency is a fractional multiple of the line frequency and is determined by the settings in the switch network 84.

In the embodiment of the invention illustrated, the low frequency generator is also effective to control the output to a load or logic circuit 104 via the conductors 108, 110 and 111 in a manner to be described in greater detail hereinafter.

In order that the invention may be better understood, each of its components will be described in detail and a description of its application to a particular application is provided hereinafter. Thus in Fig. 2 of the drawing, the units counting unit 2 is constituted by a multi-cathode gas-filled vacuum tube 112. It is provided with an anode 114 and ten main cathodes, each of which corresponds to a different digit in the digital order of one to ten as indicated by the small reference numerals inside the tube 112. For the purposes of transferring conduction from one cathode to another, a plurality of pairs of guide electrodes 116 and 118 are provided. Only two of these electrodes are illustrated for purposes of facilitating the illustration of the device. Such a multi-cathode tube is described in the co-pending application of M. E. Bivens, Serial No. 591,854, filed June 18, 1956, and assigned to the same assignee as this application, and now Patent No. 2,926,246. Reference may be had to this co-pending application for a more detailed explanation of the operation and structure of the counting tube 112. The conductors 30 to 38 are each connected to the main cathodes corresponding to the digits 10 to 2 respectively, which cathodes are also connected through resistors 120 to a ground or neutral bus 122. The main cathode indicated by the digit 1 is the predetermined cathode which indicates the completion of a count and supplies the output via the conductor 14 to the amplifier 16.

The counting unit drive 4 is constituted by a pair of gas-filled multi-electrode tubes 124 and 126. A source of A.C. supply 127 is connected to the anodes of these tubes so that the anode of the tube 124 receives a voltage 180° out of phase with the voltage on the anode of the tube 126. Phase shifting networks 128 supply a voltage to a shield grid 130 provided in each of the tubes 124 and 126 which is displaced in phase with respect to its respective anode voltage. This phase displacement may be on the order of 150° phase lag. The control grids 132 are each coupled to a source of negative voltage 134 through dropping resistors 136 in order that the tubes 124 and 126 may normally be held in an off condition. One or the other of the tubes 124 or 126 may be driven into conduction by the means of a positive voltage from either the conductor 64 or the conductor 66. Thus if it is assumed that a positive voltage of sufficient magnitude is supplied over the conductor 64 to the control grid 132 of the tube 124, this tube will conduct when both its anode voltage and shield grid 130 voltage are positive. As the tube 124 conducts, its cathode develops essentially a positive-going pulse of current. Since the cathodes of the tubes 124 and 126 are tied together at 138, it is immaterial which of the two tubes is conducting. Also provided in the counting unit drive 4 are a pair of transformers 140 and 142. Contacts 144 are provided between the primary of the transformer 140 and ground 122 while contacts 146 are provided between the transformer 142 and the ground. In the illustration in Fig. 2, the switch contacts 144 are shown as being closed while the switch contacts 146 are open. Therefore, the transformer 140 will be connected to ground 122 and the voltage appearing on the cathode of the tube 124 when it is conducting will also appear across the primary of the transformer 140. This voltage is coupled by the secondary of the transformer 140 to a rectifying device 148 so that a pulse of the opposite polarity appears on the opposite side of the rectifier 148. This pulse is coupled by the conductor 6 to the wave shaping and splitting device 8.

Figure 2:
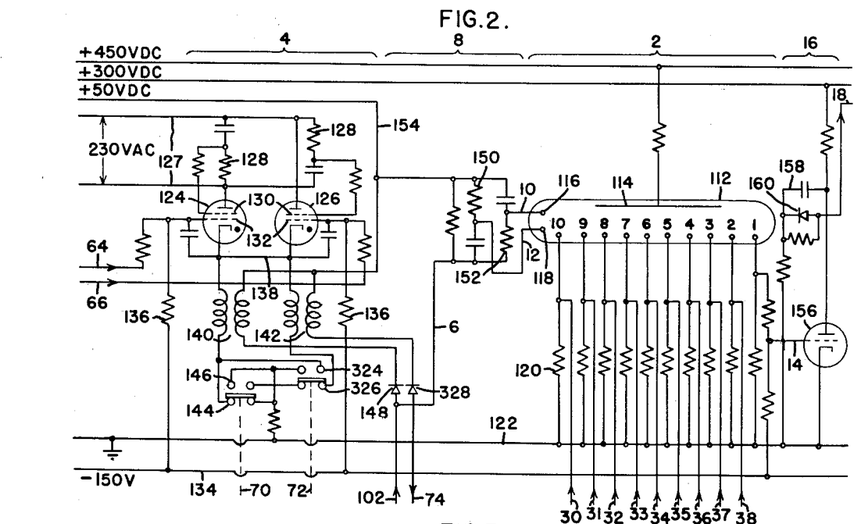
Fig. 2 is a schematic illustration of a "units" counting unit and counting tube drive forming a part of the invention.

The wave shaping and splitting device is constituted by two reactance resistance branches 150 and 152. A source of positive voltage 154 is connected to the wave shaping and splitting device so that they are normally at a positive potential. The operation of the device is such that for each pulse across tube 124 a negative pulse of voltage appears on the conductor 6. Since a resistor precedes the capacitor in the reactance resistance path 150, the voltage across the capacitor cannot change instantaneously and is delayed in phase in relationship to the pulse on 6. The pulse in the resistance reactance path 152 is delayed in phase a greater extent, and so the wave shaping and splitting device 8 supplies two negative-going pulses to the guide electrodes 116 and 118 with the pulse being supplied via the conductor 12 ahead of the pulse being supplied via the conductor 10 and these pulses will be effective to transfer conduction sequentially from one cathode to the next in the counting tube 112 in the manner described in the aforesaid co-pending application of Bivens.

If it is assumed that initially the cathode designated by digit 5 is conducting, conduction will be transferred sequentially from cathode 5 to cathode 4 as the first pulse is received due to the conduction of the thyratron 124. As each succeeding pulse is received, conduction will be transferred to cathodes indicated by digits 3, 2 and 1 in order. When the cathode indicated by digit 1 conducts, a positive-going pulse is furnished via the conductor 14 to the amplifier 16.

The amplifier 16 comprises a vacuum tube 156. The output of the amplifying tube 156 is supplied to a differentiating network 158 including a rectifying device 160 poled to conduct negative-going signals. The differentiating device shapes the output of the amplifying tube 156 into a negatively going fairly sharp pulse which is supplied by the conductor 18 to the wave shaping and splitting device 20.

Figure 3:
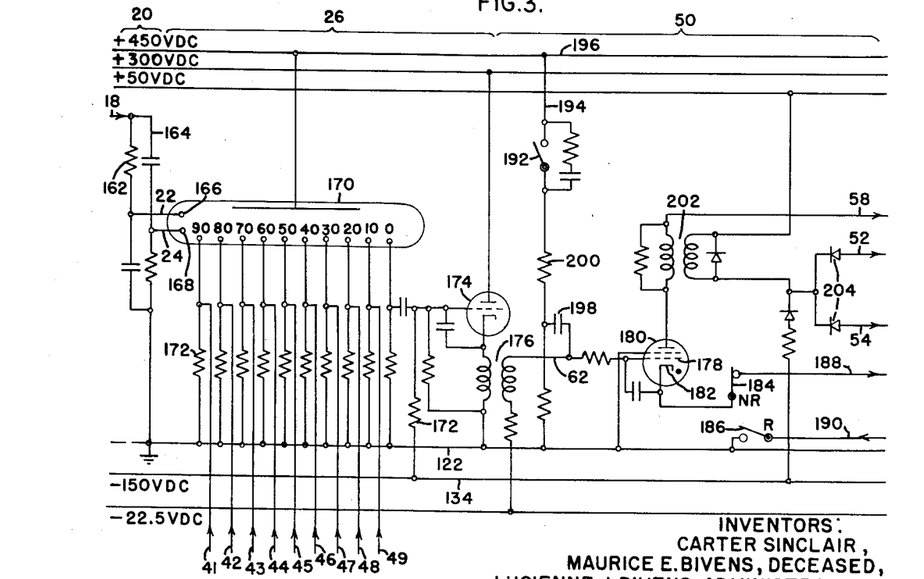
Fig. 3 is a schematic illustration of a "tens" counting unit and a sequence drive circuit forming a part of the invention.

In Fig. 3, the wave shaping and splitting circuit 20 is shown as constituted by a pair of reactance resistance paths 162 and 164 similar to the wave shaping and splitting device 8. The characteristics of these paths are such that a negative-going pulse is supplied via the conductor 22 to a guide electrode 166 which is delayed in phase with relation to a negative-going pulse supplied to the guide electrode 168 via the conductor 24. The tens counting unit is constituted by a multi-cathode gas-filled tube 170 similar to the ones counting unit tube 112. The main load cathodes in this case, however, are indicated by the digits 0 and 10 to 90 in denominations of ten. The main load cathode designated by the digit 0 is coupled through a resistor 172 to a source of negative voltage 134 while each of the other main load cathodes are connected to the conductors 41 to 49 for the digit denominations 90 to 10 respectively, and are also tied to the ground bus 122 through the resistors 172. Conduction is initially established in the multi-cathode counting tube 170 by supplying a reset pulse over one of the conductors 41 to 49 to one of the main cathodes and, as a driving pulse is received via the conductor 18, conduction will be transferred sequentially from the higher denomination digits to the lower denomination digits until conduction is established on the main load cathode designated by digit 0. When the main load cathode designated by digit 0 conducts, the pulse is coupled to an electron valve 174 connected as a cathode follower. The output of the cathode follower 174 is coupled via a transformer 176 to the conductor 62 which is connected to the grid 178 of a multi-grid gas-filled tube 180. Plate voltage is supplied to the gas-filled tube 180 via the conductor 58 in a manner to be described in greater detail in connection with the description of Fig. 4. The cathode 182 of the gas-filled tube 180 is connected to the ground bus 122 through switch means 184 and 186 when they are in one position, or through the conductors 188 and 190 when the switch means 184 and 186 are in another position, in a manner to be brought out in greater detail in the description of Fig. 4 of the drawing.

Also provided in the sequence drive device is a normally open switch 192 which may form a part of the switch 186 to operate therewith connected by means of a conductor 194 to a source of positive direct current voltage 196. A capacitor 198 connects the conductor 194 to the control grid 178 of the gas-filled tube 180. This connection is provided so that the operation of the system may be initiated by closing the switch 192. When this switch is closed, the capacitor 198 is charged through the resistor 200 to a positive voltage which is supplied to the control grid 178 of the tube 180. When the tube 180 conducts in response to this impulse of positive voltage, the conductor 58 couples it to the sequence relays 56 in order to operate them as will be explained in connection with the drawing in Fig. 4. Also, the pulse is conducted by the transformer 202 to the conductors 52 and 54 through the rectifiers 204 poled to conduct in the negative direction so that negative-going reset pulses are supplied to the switch networks 29 and 28 respectively.

Figure 4:
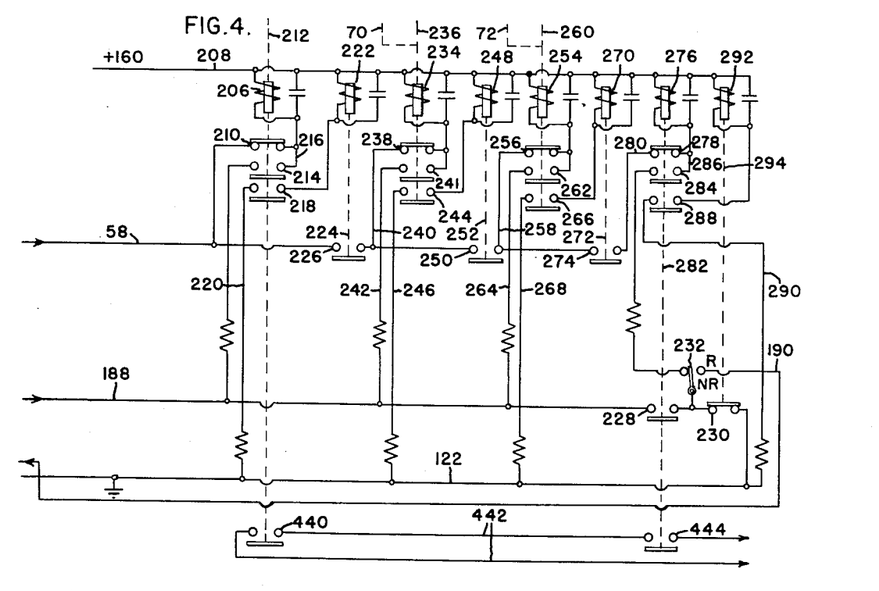
Fig. 4 is a schematic illustration of a train of sequencing relays usable in conjunction with the invention.

Referring to Fig. 4 of the drawing, there may be seen a relay train including a first relay having a coil 206. The coil 206 is connected between a source of direct current positive voltage 208, a pair of normally closed contactors 210, the conductor 58, and the primary of transformer 202 to tube 180. This circuit is the means whereby initial anode voltage is supplied to the gas-filled tube 180. The relay coil 206 through a suitable mechanical connection indicated by the dotted line 212 operates the normally closed contacts 210 and normally open contacts 214 in a conductor 216 and normally open contacts 218 in a conductor 220. The conductor 220 connects the ground bus 122 to the coil 222 which is connected at its other end to the positive bus 208. The coil 222 of a second relay, when energized, operates the normally open contacts 226 in the conductor 58 by means of a mechanical connection shown by the dotted line 224. Also included in the sequence relays 56 is a relay having a coil 234 effective through the mechanical connection indicated by the dotted line 236 to operate normally closed contacts 238 in a conductor 240 connecting the coil 234 from the source of positive voltage 208 to the conductor 58. The coil 234 also operates normally open contactors 241 in conductor 242 and normally open contactors 244 in a conductor 246. The conductor 246, through the contactors 244, connects the coil 248 of another relay from the ground bus 122 to the source of positive voltage 208. The coil 248 of this relay operates normally open contactors 250 in the conductor 58 through the mechanical means illustrated by the dotted line 252. Another relay having a coil 254 is provided and is connected to the conductor 58 through normally closed contacts 256 and a conductor 258. Coil 254 of this relay also operates, through a suitable mechanical connection 260, normally open contactors 262 in a conductor 264 and normally open contactors 266 in a conductor 268. The conductor 268, when the contactors 266 are closed, connects the coil 270 of another relay from the source of positive voltage 208 to the ground bus 122. The coil 270 operates by means of the mechanical connection 272 normally open contactors 274 in the conductor 58. Another relay having a coil 276 is connected through normally closed contactors 278 in a conductor 280 to the conductor 58. This relay coil 276, through the mechanical connection shown by the dotted line 282, operates normally open contactors 284 in a conductor 286 and normally open contactors 288 in the conductor 290 which connects the coil 292 of a last relay from the source of positive voltage 208 to the ground bus 122.

The operation of the relay train may be explained in the following manner. The contactors 210 are normally closed so that positive voltage is supplied to the anode of the tube 180. When the tube 180 conducts, the coil 206 of the first relay is energized to open the contactors 210 and close the contactors 214 and 218. The opening of the contactors 210 removes the positive voltage from the anode of the tube 180 assuring deionization of the tube, while the closing of the contactors 214 functions to seal the relay coil 206 in through the conductors 216, 188 and normally closed contactors 228 and 230 to the ground bus connection 122. The operation of the coil 206 also closes the normally open contactors 218 which completes a circuit from the source 208 to the ground bus 122 for the coil 222 of the second relay. When the coil 222 is energized, it closes the normally open contactors 226 so that the coil 234 of the third relay is conditioned for conduction when the next pulse is received via the conductor 58. Upon the receipt of the next pulse from the tube 180 via the conductor 58, the coil 234 is energized to open the contacts 238 and close the contacts 241 and 244. The closing of the contacts 241 seals in the coil 234 and energizes the relay coil 248 through the conductor 246. Coil 248, when energized, closes the contactors 250 conditioning the coil 254 of the next relay for conduction when another pulse is received via the conductor 58 from the tube 180. The operation of the relay train continues in the manner just described so that it may be seen each succeeding pulse from the tube 180 will operate in turn the relay coils 206, 234, 254 and 276. The closing of each of these coils will energize the associated relay coils 222, 248, 270 and 292 in sequence in order to condition the next relay coil for energization. The particular device shown and described is a relay train for controlling four functions in a sequence. Obviously, additional functions may be added if desired.

In order that the cathode 182 of the tube 180 may be connected to ground, as for different modes of operation of the system, the switches 184 and 186 shown in Fig. 3 are provided. The conductor 188, which extends from a first position of the switch 184 designated NR for "Non-Repeat," is connected to ground through the normally closed contacts 228 and 230 as may be seen in Fig. 4. The other position of the switch 184 is designated R for "Repeat." In the repeat position, the condutcor 190 is connected to the cathode of the tube 180 and through a switch 232 which may form a part of the switch 184 and has two positions designated NR and R. In order that the operation of the device in relation to the repeat and non-repeat switches 184 and 232 may be understood, the following description is hereby given. If the switches 184 and 232 are in the position shown, then the system is conditioned for a non-repeat operation. Thus if the switch 192 is closed and the switch 186, a pulse will be supplied to the control grid 178 of the tube 180 as hereinbefore pointed out. Switches 192 and 186 may be mechanically coupled to each other and operated momentarily, if desired, by a time delay relay energized by suitable switch means. In the non-repeat position, the cathode 182 of the tube 180 is connected to the ground 122 through the switch 184, conductor 188 and normally closed contacts 228 and 230. Thus when the relay coil 276 is energized in its proper turn, the contacts 228 open removing the cathode connection of the tube 180 and, therefore, it will not be able to conduct as succeeding impulses arrive from the tens counting unit 170 through the transformer 176 and condutcor 62. Also, the ground connection for each of the coils 206, 234 and 254 will be broken causing each of the relays of which they are a part to drop out. Thus it may be seen that the closing of the switch 192 initiates operation of the sequence controller and it will control the operation through one sequence even though the switch 192 may be only momentarily closed. When the switches 184 and 232 are moved to the repeat position and the switches 186 and 192 are closed, and so maintained to cause the initiating impulse to be developed by the tube 180, the relay train begins to operate and it may be seen that the cathode 182 is connected to the ground bus 122 through the switches 184 in the repeat position and the switch 186. Since each of the relay coils 206, 234, 254 and 276 are connected to the ground by means of the conductor 188 and normally closed contacts 228 and 230, it may be seen that when the contact 228 is opened by energization of the coil 276, the ground connection for all the other relays 206, 234 and 254 is broken and these relays drop out and are in condition for another operation. These relays in dropping out also cause the relays 222, 248 and 270 to drop out to condition the device for another sequence of operations, and as long as the switches 192 and 186 are maintained closed, the system will continue to repeat the sequence of operations.

Figure 5:
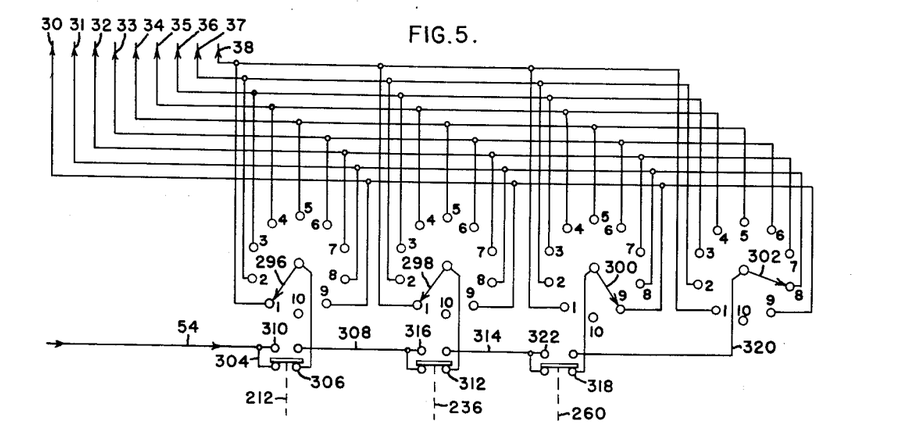
Fig. 5 is a schematic illustration of a units switch network usable in conjunction with the "units" counting unit.
Figure 6:
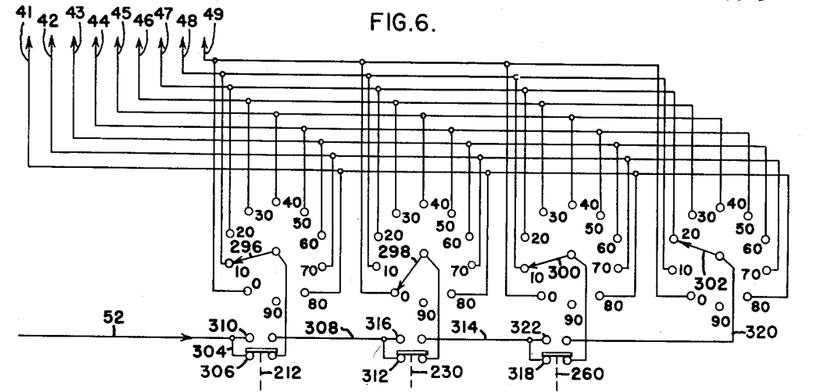
Fig. 6 is a schematic illustration of a switch network usable in conjunction with the "tens" counting unit.

In order to control the time of each function in a series of functions, the switch networks shown in Figs. 5 and 6 are utilized. A detailed description of the operation of the switching networks will be given only of the showing in Fig. 5 inasmuch as each of these networks have the same structure and perform the same function, the difference being that one determines the time in terms of units of cycles while the other determines the time in terms of tens of cycles. The network comprises four switches 296, 298, 300 and 302. Each switch has ten positions connected by contactors to the conductors 30 to 38. The connections are from the switch positions indicated by the digits 1 to 9 in the case of each of the switches 296, 298, 300 and 302. Each switch controls the time of a given function in that whether or not it conducts a resetting pulse from the tube 180 to either the units counting unit 112 or tens counting unit 170 is determined by the position of contactors in the manner to be described. The conductor 54 from the rectifier 204 is connected to the movable contactor of the switch 296 through a conductor 304 and normally closed contacts 306. Conductor 54 is also connected to the movable contactor of the switch 298 through a conductor 308, normally open contactors 310 and normally closed contactors 312. The conductor 308 is connected to the movable contact of the switch 300 through a conductor 314, normally open contactors 316 and normally closed contactors 318, and the conductor 314 in turn is connected to the movable contactor of the switch 302 through a conductor 320 and normally open contactors 322. The arrangement of the switch network 29 for the tens counting unit 170 is the same except that the reset impulse is supplied via the condutcor 52 and the contacts of the switches 296, 298, 300 and 302 are connected to the conductors 41 to 49 and their designation is not in unit digits, but is rather in denominations of tens. In the operation of this portion of the device, it may be seen that when a reset pulse is received via the conductors 52 or 54 it will be supplied through the conductors 304 and contactors when closed 306 to the movable contact of the switch 296 and over one of the conductors 30 to 38 as determined by the setting of the switch 296. It should be noted that the movable contactor 306 is operated by the mechanical connection 212 from the relay coil 206 and, even though the reset impulse over the conductors 52 and 54 is supplied at the same time as the driving impulse for the relay train 56 over the conductor 58 due to the inherent mechanical delay in a relay, the contactor 306 will not open before the reset pulse has been directed to the preselected one of the conductors 30 to 38. The effect of the driving pulse furnished by the tube 180 is to energize the coil 206 of the first relay opening the normally closed contactors 306 and closing the normally open contactors 310 so that the succeeding reset pulse will be supplied via the conductor 54, closed contactors 310 and normally closed contactors 312 to the movable contact of the switch 298 to the selected one of the conductors 30 to 38. This operation will proceed as the succeeding relay coil 254 is energized until the reset pulse is supplied to the time setting switch 302 for the last function in the sequence of functions.

By way of further description of the operation of the time setting means, the following is given: If the function determined by the setting of the switch 296 is considered and it is assumed that it is desired to have such a function last for a time equal to thirty-three cycles of line frequency, the movable contactor of the switch in Fig. 5 is set to the stationary contactor designated by digit 3, in which case contact is established with conductor 36. Referring to Fig. 2, it is noted that conductor 36 is connected to the main load cathode of the units counting unit 112 indicated by digit 4, which will be driven into conduction by the reset pulse and as driving impulses are received from the counting unit drive 4, conduction will be transferred to main load cathodes designated by digits 3, 2 and 1 respectively. When conduction is established at main load cathode designated by digit 1, an impulse is furnished to drive the tens counting unit 170. Since it was desired to time the function at thirty-three cycles of line frequency, the movable contactor of the switch 296 in Fig. 6 has been set at the stationary contactor designated by the number 30 so that contact is made with conductor 47 which is connected to the main load cathode designated by the digit number 30 in the tens counting unit 170. When the driving impulse is received as the result of conduction of the main load cathode designated digit 1 in the counting tube 112, conduction is transferred from the main load cathode designated by digit 30 in the tens counting unit 170 to the next succeeding main load cathode designated by digit 20. After conduction has begun at the main load cathode designated by digit 1 in the units counting unit 112, it will then be driven by the next driving impulse from the counting unit drive 4 to the main load cathode indicated by digit 10 and will again be transferred sequentially back to the main load cathode designated by digit 1 by succeeding driving pulses from the drive 4, at which time another driving impulse will be delivered to the tens counting unit 170 to transfer conduction from the main load cathode designated by digits 20 to the main load cathode designated by digit 10. This operation will be repeated until conduction is established at the main load cathode designated by the digit 0 in the tens counting unit 170, at which time the tube 180 will be caused to conduct delivering a resetting pulse via the conductors 52 and 54 which are directed as by the setting of the switches 298 in Figs. 5 and 6, and a relay driving pulse via the conductor 58 to cause relay 234 to pick up and commence the timing of the next function in the sequence. This operation will be repeated until the entire sequence has been completed and will repeat itself again if the switches 184 and 232 are in the position shown and the switch 186 is maintained closed. If switches 184 and 232 are in the non-repeat position, the operation will not continue even though the switches 192 and 186 are maintained closed.

If it is desired to time a function to have a duration of either 10 or 100 cycles, then the selector switches in Figs. 5 and 6 corresponding to that function are set at the position indicated by the numbers 10 and 90. It is to be noted that these positions are blank positions, that is, not connected to one of the cathodes in the tubes 112 and 170. Since conduction is occurring at the cathode designated by the numeral 1 in the tube 112 and by the numeral 0 in the tube 170, a complete count of ten cycles will be made before conduction again occurs at the 1 cathode in the tube 112 and a count of 100 cycles will be made before conduction again occurs at the 0 cathode in the tube 170. It may be seen that the counts of 10 and 100 are not insured for a first function to be timed, but are insured for subsequent functions as upon the completion of any function conduction is occurring at the 1 cathode in the tube 112 and 0 cathode in the tube 170.

In the portion of the invention just described, it may be seen that the system may be used to control and time the plurality of functions in a sequence of functions. The timing is determined by the frequency with which the counting unit drive 4 is energized. The manner of supplying the positive voltage necessary to bias the thyratrons 124 and 126 into conduction has been referred to only briefly, but will now be described in conjunction with another portion of the invention. It should be understood, however, that the means described hereinafter are not necessary for the operation for as much of the invention as has been described, and the positive biasing voltage for the counting unit drive 4 may be derived from any suitable source and controlled by contactors in the sequence relays to be effective when initiation of the system is effected.

As has been explained in connection with the system described above, the impulses of the thyratrons 124 and 126 forming a part of the counting tube drive 4 are coupled to the wave shaping and splitting circuit 8 through the transformer 140 which is connected through the normally closed contacts 144 to the ground bus 122, whereas the transformer 142 is ineffective inasmuch as the normally open contacts 146 prevent a complete circuit from being established to the ground bus 122. When it is desired to operate the device so that one or more functions is to be timed at a lower frequency than the remaining functions, this may be accomplished in conjunction with the low frequency generator and low frequency counting means 78. Referring to Fig. 4, it is to be noted that the relay coil 234 has a mechanical means indicated by the dotted line 70 extending to the contacts 144 and 146 shown in Fig. 2, while relay coil 254 has mechanical actuating means indicated by the dotted line 72 extending to normally open contacts 324 in shunt with the normally closed contacts 144 and to normally closed contacts 326 in series with the normally open contacts 146. Thus in the operation of the device, after the relay coil 206 has been energized the relay coil 234 is energized when the time of the function controlled by relay 206 is complete. When the coil 234 is energized, the contacts 144 are opened while the contacts 146 are closed so that the transformer 140 is no longer connected to the ground bus 122 while the transformer 142 is. In this mode of operation, when either the tube 124 or 126 conducts the positive-going pulse at the cathode will be supplied by the transformer 142 to the rectifying device 328 and thence by the conductor 74 to the wave shaping and splitting circuit 76 shown in Fig. 7. The negative-going pulse over the conductor 74 is shaped by the reactance resistance paths 330 and 332 to form two negative-going pulses wherein the pulse in the conductor 82 leads the pulse in conductor 80 by a slight amount in order to effect sequential transfer of conduction in the low frequency generator counting device 78.

Figure 7:
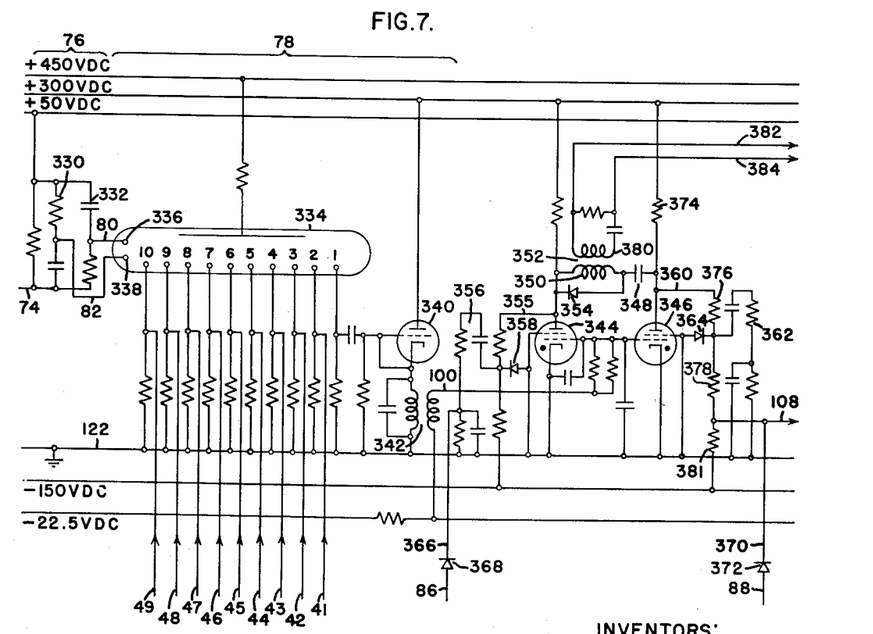
Fig. 7 is a schematic illustration of a low frequency counting unit and a portion of a low frequency generator forming a part of the invention.

The low frequency generator counting device 78 shown in Fig. 7 includes a multi-cathode gas-filled counting tube 334 similar to the tubes in the units counting unit 2 and tens counting unit 26. The multi-cathode tube 334 is provided with main load cathodes each indicated by a digit from 1 to 10. The main load cathodes from 2 to 10 are connected to the conductors 41 to 49 respectively and the tube is also provided with guide electrodes 336 and 338 between each main load cathode. If conduction is initially occurring on one of the main load cathodes as, for example, the one indicated by the digit 2, upon the arrival of a driving impulse via the conductor 74 from either the thyratron 124 or 126 conduction will be transferred by the action of the guide electrodes 336 and 338 to the main load cathode designated by digit 1. The output thereof is amplified by the electron tube 340 connected as a cathode follower and having the primary of a transformer 342 in its cathode circuit. The postive-going voltage due the conduction of tube 340 is coupled via the transformer 342 and conductor 100 to the control grids of a pair of thyratrons 344 and 346. In the embodiment illustrated in Fig. 7, the thyratron 346 is normally conducting and its anode is coupled to the anode of the tube 344 through a commutating capacitor 348 and primary 350 of a transformer 352. The anode of the thyratron 344 is connected by means of a conductor 355 to a resistor-capacitor wave shaping network 356. Also connected to the network 356 and to the ground bus 122 is a rectifying device 358. Similarly, the anode of the thyratron 346 is connected by a conductor 360 to a wave shaping network 362 which network is connected to the ground bus 122 by a rectifying device 364. The conductor 366 couples the output of the network 356 to the reset pulse conductor 86 through the rectifying device 368 while the output of the network 362 is coupled to the reset pulse conductor 88 through the conductor 370 and rectifying device 372. The arrangement is such that when the thyratron 346 is conducting, the anode of the thyratron 346 is at some positive potential. When a pulse is received via the transformer 342 and conductor 100 on the common control grid connections of the thyratrons 344 and 346, the effect will be to turn on the thyratron 344. When the thyratron 344 begins to conduct, its anode voltage will drop and this will be coupled through the rectifying device 354 shunting the primary 350 of the transformer 352 and the commutating capacitor 348 to the anode of the thyratron 346 to turn it off, and the thyratron 344 will continue to conduct until the next impulse is received via the conductor 100 which time will be determined by the count being effected in the counting tube 334. Also, as the thyratron 344 is turned on, the negative-going drop in its anode voltage pulse is shaped into a peaked form by the network 356 and coupled by the conductor 366 to the rectifying device 368 to the conductor 86 to reset the counting tube 334 in a manner to be described hereinafter. Similarly, when the next pulse from transformer 342 turns tube 346, a negative-going pulse will be coupled to the conductor 88 by the network 362 and rectifier 372. The rectifying devices 358 and 364 function to clip or hold these negative-going pulses at ground level by passing further drops in the anode potentials of the thyratrons 344 and 346 as these devices conduct more fully. Connected to a voltage divider consisting of the load resistor 374 and resistors 376, 378 and 381 is the conductor 108 which is effective to control the initiation of a function in a load circuit. In the arrangement shown, there is normally a negative voltage on the conductor 108 when the thyratron 346 is firing. However, when the thyratron 346 is not firing, a positive voltage appears on the conductor 108 and may be utilized to actuate a device controlling load circuit. The secondary 380 of the transformer 352 is coupled by means of the conductors 382 and 384 to another portion of the low frequency generator shown in Fig. 8. Since a pulse will be delivered through the primary 350 of the transformer 352 only when the thyratron 346 begins to conduct due to the shunting action of the rectifying device 354, this pulse will therefore only be supplied via the conductors 382 and 384 to the common grid connection of a second pair of thyratrons 386 and 388. The thyratrons 386 and 388 are provided with a common grid connection as pointed out and their anodes are coupled together by means of a commutating capacitor 390 so that when one is conducting the other will not. If the thyratron 388 is normally conducting, positive voltage output thereof will be coupled via the conductor 66 to the thyratron 126 in the counting tube drive 4 and will provide the positive voltage sufficient to cause this tube to conduct each time its anode is at a positive potential. So, therefore, the normal operation of the device, if the thyratron 388 is conducting, positive voltage necessary for the conduction of one of the tubes, namely the tube 126 in the counting tube drive, will be provided to furnish the driving pulses to the wave shaping and splitting device 8. Upon the receipt of the pulse via the transformer 352 and conductors 382 and 384 at the common grid connection of the thyratrons 386 and 388, the thyratron 386 will be turned on since it is off and the thyratron 388 will be turned off due to the action of the commutating capacitor 390 coupling the voltage drop of the anode of the thyratron 386 to the anode of the thyratron 388. Since the thyratron 386 is not conducting, a positive voltage will exist on the conductor 111 connected to a voltage divider consisting of the resistors 392, 391, 396 and 398 and in the primary 400 of a transformer 402. Likewise, since the thyratron 388 is normally conducting, a negative voltage will appear on the conductor 110 connected to the voltage divider consisting of the resistors 404, 406, 408 and 410 and the primary 400 of the transformer 402. As conduction is changed from one to the other of the thyratrons, the voltage on the conductors 110 and 111 will reverse polarity and may be effective to control different means in the load circuit. Also as conduction is changed from one to the other of the thyratrons 386 or 388, the positive voltage will be supplied over either of the conductors 64 or 66 to the thyratrons 124 or 126 in the counting tube drive 4 to cause one or the other of them to supply driving pulses to the low frequency generator counting means 78. The secondary 412 of the transformer 402 is connected to a source of positive voltage and is coupled to the conductor 102 by a rectifying device 414. Thus again each time the conduction of the tubes 386 or 388 is reversed, a negative-going pulse will appear on the conductor 102 to drive the units counting unit 112 to its next conducting main cathode and the counting or timing means constituted by the units counting unit 2 and tens counting unit 26 will now count at a frequency lower than line frequency. The difference between the timing at line frequency and the timing at lower than line frequency is determined by the setting of the low frequency generator counting means 78 which is determined by the setting of the switches in the switch network 84.

Figure 9:
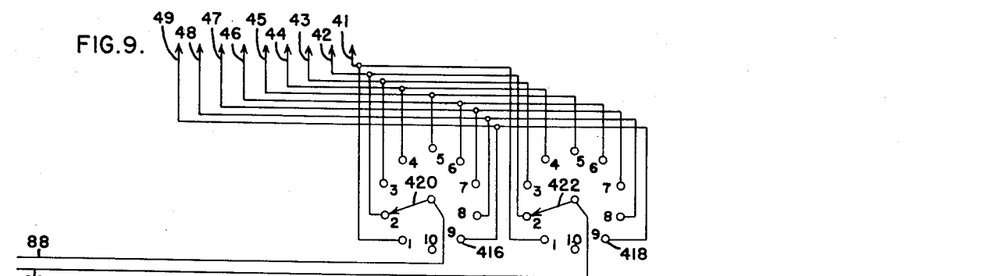
Fig. 9 is a schematic illustration of a switch network usable in conjunction with the low frequency counting unit.

The network 84 is shown in Fig. 9 and comprises a pair of switches 416 and 418. Each switch has a movable contact 420 and 422, respectively, and ten stationary positions each one designated by a digit from 1 to 10. Each of the stationary positions of the switches 416 and 418, except 10, is connected to the conductors 41 to 49 respectively. The movable contacts 420 and 422 of the switches 416 and 418 are connected to the conductors 86 and 88. The conductor 86 couples the negative-going pulse developed when the thyratron 344 commences conduction to the selected one of the main cathodes in the multi-cathode tube 334 while the conductor 88 couples the negative-going pulse developed when the thyratron 346 begins to conduct to the selected one of the main cathodes in the multi-cathode tube 334. Thus two sub-functions may be timed by the use of this means. Since the conduction of the thyratrons 344 and 346 is reversed, each time the multi-cathode tube 334 reaches the end of a timing count, a reset pulse will be delivered at such a time for the other function and it will time until its operation is complete.

Figure 10:
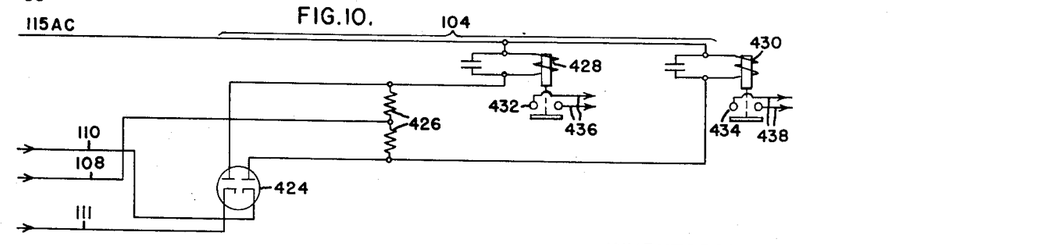
Fig. 10 is a schematic illustration of a logic or load circuit usable in conjunction with the invention.

In Fig. 10 of the drawing, I show a load or logic circuit such as illustrated in the box diagram at 424 of the dual diode type of Fig. 1, which may be utilized by the system. In the operation of this circuit, if a negative voltage is supplied via the conductor 108 and resistors 426 to the anodes of a dual diode 424, regardless of the polarity of the voltage supplied to the conductors 110 and 111 connected to the cathodes, no conduction will take place if the voltage on 108 is negative as is the case when thyratron 346 is conducting. However, when tube 346 is not conducting, then the anodes of tube 424 are positive and either the right or left-hand rectifier will conduct depending on whether 111 or 110 are positive or negative. Depending on which of these is conducting, either the relay 428 or 430 will operate to close their contacts 432 or 434 respectively to energize one or the other of a pair of load circuits 436 or 438. The complete system is adapted to have particular application in a resistance welding operation. More specifically, in that kind of resistance welding known as low frequency welding wherein current is drawn from a three-phase supply and converted by means of a frequency converter together with suitable firing control circuits to a relatively low frequency single-phase output which is supplied to the welding transformer of a welding machine. In the use of resistance welding devices of this nature, it may be found desirable during the weld period to provide a period during which heat is supplied to the weld and called the heat period, and another period during which no current is supplied to the weld and called the cool period; several such periods of heat and cool being effected during the time allotted for the operation of the weld function in the complete sequence of the welding operation.

In the application of the invention to such an operation, the relay coil 206 may function to control a solenoid valve in a hydraulic system actuating the work engaging elements of the welding machine and in such an application will act to close a pair of normally open contactors 440 in a conductor 442 in the solenoid valve circuit. Also provided in the conductor 442 are a pair of normally closed contacts 444 which are operated when the relay coil 276 is energized to cause the work engaging elements of the machine to be withdrawn.

Figure 8:
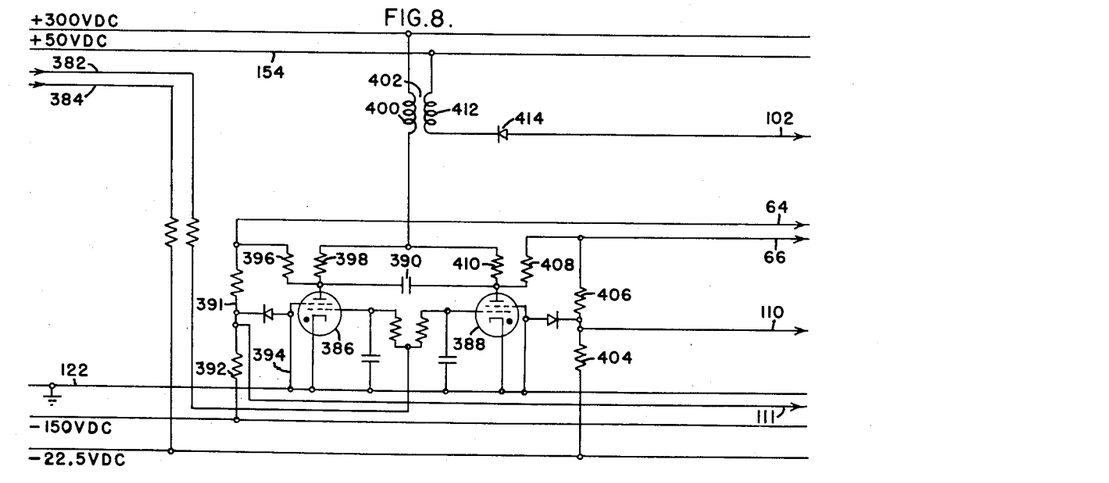
Fig. 8 is a schematic illustration of another portion of the low frequency generator forming a part of the invention.
Figure 11:
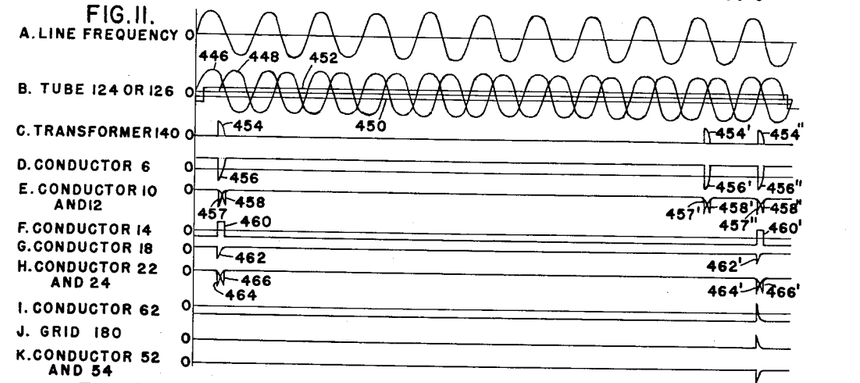
Fig. 11 illustrates charts of characteristic curves which illustrate the operation of the invention in controlling one function in a sequence of functions.

In the operation of the system in such a device, the first function to be effected and timed is the squeeze function and reference may be had to Fig. 11 in which Charts A to K illustrate in a plot of voltage against time the operation of various elements of the system in their proper order. In this figure, Chart 11-A illustrates the line frequency shown as a sinusoidal wave. If it is assumed that the squeeze period is to be eleven cycles in length, the movable contacts of the switches 296 in Figs. 5 and 6 are set to indicate this amount; that is, the movable contact in Fig. 5 is set on the number 1 contact and the movable contact in Fig. 6 is set on the number 10 contact. Suitable starting means have been provided to insure that the thyratron 388 illustrated in Fig. 8 is conducting so that a positive voltage is supplied via the conductor 66 to the control grid 132 of the thyratron 126 (see Fig. 2). Thus in Fig. 11, Chart 11-A shows the line frequency and, as indicated, represents eleven cycles of such frequency. Therefore, the voltage on the anode of the tube 126 is shown in Chart 11-B and is designated by reference numeral 446. The voltage supplied to its shield grid is displaced in phase approximately 150° and is represented by the curve designated by reference numeral 448. The negative bias voltage supplied via the resistor 136 is represented by the curve indicated by reference numeral 450. With tube 388 conducting, a positive voltage illustrated by a curve 452 is supplied to the control grid 132 and is sufficient to cause conduction of the thyratron whenever the anode voltage and shield grid voltage are positive. In the operation of the system, the timing of the particular function of squeeze which may be termed a non-heat function it is seen that the contacts 144 are closed while the contacts 146 are open. Therefore, the positive-going pulses developed at the cathode of the tube 126 are coupled through the transformer 140 as shown by the curve 454 in Chart 11-C which illustrates only the first and last two pulses for the purpose of clarity in the drawing. The resultant pulse over the conductor 6 is a pulse which takes this conductor from the voltage of the positive source 150 to a predetermined negative value and is shown by the curve 456 in Chart 11-D. The wave shaping and splitting network 8 develops the pulse shown at 456 into two negative-going pulses wherein the pulse via the conductor 10 shown by curve 457 in Chart 11-E is phase retarded in relationship to the pulse over conductor 12 shown at 458. The application of the pulses shown at 457 and 458 to the guide electrodes 116 and 118 of the multi-cathode gas-filled tube 112 is sufficient to cause sequential conduction in this tube each time such pulses are received.

When the initiation switch 192 was closed, the capacitor 198 coupling the conductor 194 to the control grid 178 of the thyratron 180 was sufficient to cause it to supply negative-going pulses via the conductor 54 to the movable contact of the switch 296 in Fig. 5 and thereby via the conductor 38 to establish initial conduction in the counting tube 112 at the main load cathode indicated by the digit 2. When the driving pulses 457 and 458 were supplied to the guide electrodes 116 and 118, conduction was then transferred to the main load cathode designated by digit 1 pulse voltage was developed on the conductor 14 as shown by the curve 460 in Chart 11-F. The integrating network 158 and rectifier 160 thereby developed the negative-going pulse shown at 462 in Chart 11-G. This negative-going pulse was shaped similarly to the negative-going pulse in Chart 11-D and the two phase displaced pulses 464 and 466 in Chart 11-H were supplied to the control electrodes 166 and 168 in the counting tube 170. Since the switch 296 in the switch network 40 in Fig. 6 was set at the contact indicated by the numeral 10, the reset pulse supplied from the initial conduction of the thyratron 180 was coupled by the conductor 52 through the conductor 304 and closed contacts 306 to the conductor 48 so that conduction was initially established at the main load cathode indicated by the digit 20 in the counting tube 170 and upon the receipt of the driving pulse from the conductor 18 conduction was transferred to the main load cathode designated by the number 10. Since the thyratron 388 is still conducting, driving pulses will continue to be delivered to the counting tube 112 at line frequency until conduction is again transferred to the main load cathode of that tube designated by digit 1. Chart 11–C shows the conduction for the first such driving pulse 454 and for the 10th driving pulse 454′ and the 11th driving pulse 454″. Likewise, Chart 11–D shows pulses 456, 456′ and 456″ while Chart 11–E shows pulses 457 and 458, 457′ and 458′, and 457″ and 458″. When eleven such driving pulses have been developed by the counting tube drive means 4, a second positive-going pulse is developed on the conductor 14 due to the conduction of the main cathode indicated by numeral 1 in the counting tube 112. As may be seen by pulses 462′, 464′ and 466′, conduction is then commenced at the last main load cathode indicated by the 0 digit in the counting tube 170. This pulse is coupled through the cathode follower to the grid 178 of the thyratron 180 (see Chart 11–J) causing it to conduct and furnish a negative-going pulse via the conductors 52 and 54 (see Chart 11–K) and a positive-going pulse via the conductor 58. Since on the first positive-going pulse developed when the initiation switch 192 is closed the relay coil 206 was energized and in turn energized the relay coil 222, the contacts 226 have been closed and the relay 234 is now energized so that the reset pulses are coupled through the conductors 52, closed contacts 310, conductor 308 and closed contacts 312 to the switches 298 in Figs. 5 and 6 in order to commence the timing of the next function.

Figure 12:
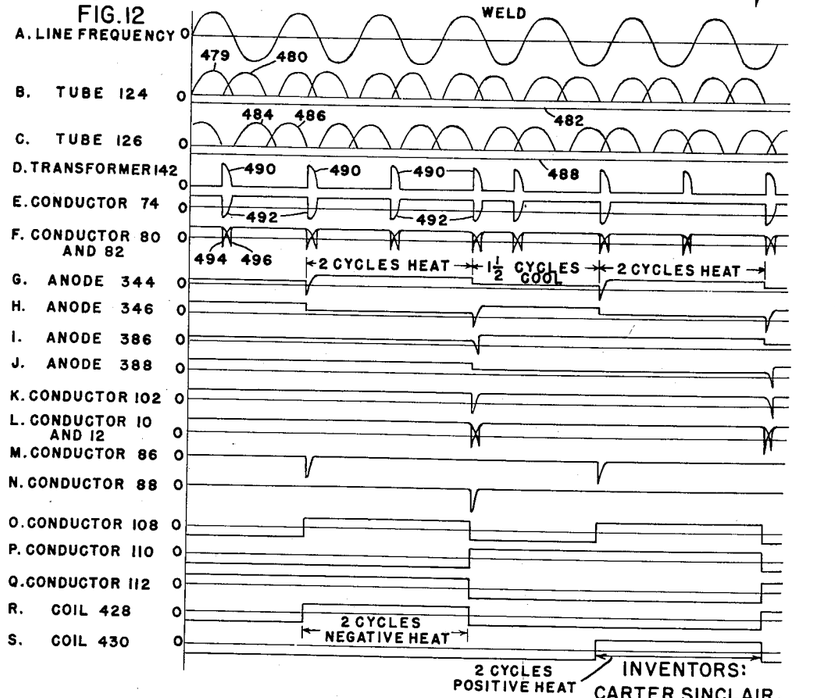
Fig. 12 illustrates charts of characteristic curves which illustrate the operation of the invention in controlling another function in a squence of functions, which function is effected repetitively during the time set for its operation.

In order to aid further understanding of the invention, Fig. 12 in Charts A to S thereof present an illustration of voltage plotted against time of various components of the device during the operation in the timing of a weld function in a welding operation, which weld function provides for alternate periods of heat and cool; the periods of heat being periods wherein welding current is supplied but at a frequency lower than line frequency.

Chart 12–A in Fig. 12 is a plot of the voltage against time of the line frequency current. Curve 479 in Chart 12–B is a plot of the positive half-cycles of the voltage on the anode of tube 124 while curve 480 is a plot of the voltage on the shield grid of tube 124. The bias normally applied to the control grid is indicated by the straight line curve 482. Likewise, curve 484 in Chart 12–C is a plot of the positive half-cycles of voltage on the anode of tube 126 while curve 486 is a plot of the voltage on the shield grid of this tube and straight line curve 488 is a plot of the bias voltage normally applied to the control grid of this tube. From Chart 12–J, it may be seen that tube 388 is conducting and, therefore, its anode voltage is at some positive value which is coupled via the conductor 66 and is, therefore, sufficient to bias the tube 126 into conduction when both the anode voltage and shield grid voltage are positive so that the positive-going pulses 490 in Chart 12–D are supplied to the transformer 142 and, after rectification by the device 328, appear on the conductor 74 as the negative-going pulses 492 in Chart 12–E. If the movable contact 420 of the switch 416 has been set at the digit 2 to indicate two cycles of cool and the movable contact 420 of the switch 418 has been set at the figure 2 to indicate two cycles of heat, then the negative-going pulses 492 will be formed by the wave shaping and splitting means 76 into the two negative-going pulses 494 and 496 (see Chart 12–F) and initial conduction will occur on the main load cathode designated by the digit 3 in counting tube 334 and conduction will be transferred from thence to each of the succeeding main load cathodes until the cathode designated by digit 1 conducts and a pulse is coupled by the cathode follower 340, transformer 342 and conductor 100 to the common grid connections of the tubes 344 and 346. Since tube 346 is normally conducting, as may be seen in Chart 12–H, the tube 344 will be turned on while the tube 346 will be turned off. At the same time tube 344 is turned off, a negative-going pulse is furnished by means of the voltage divider 358, conductor 366 and rectifying device 368 to conductor 86 as seen in Chart 12–M. This negative-going pulse is the reset pulse which is coupled by means of the movable contact 422 in switch 418 to establish initial conduction over conductor 42 to the main load cathode designated by digit 3 in the counting tube 344. Since the rectifying device 354 is effective to shunt the primary 350 of the transformer 352, no pulse will be transferred by means of this transformer and the conductors 382 and 384 to either of the tubes 386 or 388 and the tube 388 will continue to conduct so that the tube 124 will continue to furnish the pulses 490 and 492. After the initiation of conduction of tube 344, two of the pulses 492 will be sufficient to cause conduction to take place at the main load cathode designated by digit 1 in tube 344 and at which time a pulse will be coupled by tube 340, transformer 342, and conductor 100 to the control grids of the tubes 344 and 346. In response to the receipt of this pulse, tube 344 will be turned off and tube 346 will be turned on (see Charts 12–G and 12–H). The beginning of conduction of tube 346 is effected to reverse the conduction of the tubes 386 and 388 and also is effective to supply the reset pulse shown in Chart 12–N over conductor 88 which will initiate conduction at the main load cathode designated by digit 3 in tube 334. Also, at the time that conduction is reversed between the tubes 386 and 388, a pulse will be supplied by conductor 102 to the wave shaping and splitting device 8 to cause the pulses shown in Chart 12–L to be developed to drive the conduction to the next succeeding main load cathode in the units counting unit 112. It may be seen that this operation will be continued until the time determined by the setting of the movable contacts of the switches 298 in switch networks 28 and 30 has been completed and a pulse will be supplied via the conductor 62 to the sequence drive 50 to cause the coil 254 to be energized, which coil through the mechanical connection 72 closes the normally open contacts 324 and opens the normally closed contacts 326. When this occurs, the weld function will have been completed and the counting tube drive 4 will no longer drive through the transformer 142, but will drive through the transformer 140 in order that the counting tube 112 may be driven directly. Thus it may be seen that the system provides for driving the counting tubes 112 at two separate rates. On such rate may be at line frequency or at the frequency of any source while the second such rate is at a frequency determined by the setting of the low frequency generator counting device 78. It is obvious that the contacts 144, 146, 324 and 326 may be arranged to be operated by relay coils other than coils 234 and 254 and when so arranged may cause more than one function to be timed at a frequency lower than the line frequency.

When the relay coil 234 has been energized and the system is timing at the lower frequency, the control of the load in the illustrated embodiment will occur as follows. When the tube 346 is conducting as shown in Chart 12–H, it may be seen from Chart 12–O that the conductor 108 is normally at a negative value. This negative value applied to the anodes of the dual diode 424 shown in Fig. 10 is sufficient to prevent this tube from conducting. It may also be seen that with the tube 388 normally conducting, the conductor 110 is normally at a negative value as shown in Chart 12–P, while Chart 12–Q shows that the conductor 111 is normally at a positive value. Since the conductor 108 is negative as long as tube 346 is conducting, the dual diode 424 will not conduct until a positive voltage is impressed on conductor 108. This occurs when tube 344 commences to fire and conduction will take place on either the right or left-hand side of the dual diode 424. Since the conductor 110 is negative due to the conduction of tube 388, conduction will occur on the left-hand side of the tube when tube 344 conducts and the coil 428 of the load circuit controlling relay will be energized to close the contacts 432 in the load circuit 436. When the tube 344 next conducts, it may be seen that the polarities on the conductors 110 and 111 have reversed so that the right-hand side of the dual diode 424 will conduct energizing the relay coil 430 to close the contacts 434 in the load circuit 438.

Although in accordance with the provisions of the patent statutes the principle of this invention has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. A sequence control system comprising at least one multi-cathode electric valve, a plurality of selector switches, means connecting said selector switches to cathodes in said valve, an electric discharge device, means coupling said electric discharge device to a first selected one of the cathodes in said valve whereby said device is rendered conductive in response to conduction of said selected cathode, a plurality of load circuit controlling means, means coupling the output of said electric discharge device to said load circuit controlling means and to said selector switches, means connecting each of said load circuit controlling means to a corresponding one of said selector switches whereby when one of said load circuit controlling means is operated the corresponding selector switch is connected to said device to couple the output thereof to a second selected one of said cathodes in said valves, and means to transfer conduction from said second cathode in said valve to succeeding cathodes in said valve in a sequential manner and at a predetermined rate until conduction occurs at said first selected cathode.

2. A sequence control system comprising at least one multi-cathode electric valve, each cathode in said valve corresponding to a digit in a decimal numbering system, a plurality of selector switches, each selector switch having a number of positions equal to one less than the number of cathodes in said valve, each position representing a digit in said numbering system, means connecting each of said switch positions to a cathode in said valve corresponding to the digit represented by said position, an electric discharge device, means coupling said electric discharge device to the cathode in said valve not connected to one said position in said selector switches whereby said discharge device is rendered conductive in response to conduction of said cathode, means including movable contact means connecting the output of said discharge device to a selector forming a part of each of said selector switches, a plurality of load circuit controlling means, operating means connecting each of said load circuit controlling means to the movable contacts between said discharge device and said selector in a selector switch corresponding to said load circuit controlling means whereby the output of said discharge device is coupled to one of the cathodes in said valve selected by the position of a selector in a selector switch coupled to the discharge device by the position of said movable contacts, means coupling the output of said discharge device to said load controlling means whereby said load controlling means are rendered operative in response to conduction of said discharge device, and means for transferring conduction from said selected cathode in said valve to succeeding cathodes in a sequential manner and at a predetermined rate.

3. A sequence control system comprising a plurality of multi-cathode electric valves, each cathode in a first one of said valves corresponding to a number in the decimal order of 1–10, each cathode in succeeding valves corresponding to a number in progressively higher decimal orders of ten numbers, a plurality of sets of selector switches, each switch in said sets of selector switches having a number of positions equal to one less than the number of cathodes in said valves, each position representing a number in one of said decimal orders, means connecting said positions to corresponding cathodes in said valve, an electric discharge device, means coupling the control element of said electric discharge device to a cathode in one of valves not connected to a switch position whereby said discharge device is rendered conductive in response to the conduction of said cathode, means coupling the output of said discharge device to said sets of selector switches, said last-mentioned means including movable contactors associated with each of said selector switches, a plurality of load circuit controlling means, circuit means interconnecting said load circuit controlling means and coupled to the output of said discharge device whereby each one of said load circuit controlling means when rendered operative in response to conduction of said discharge device conditions a succeeding load circuit controlling means for operation in response to a succeeding conduction of said discharge device, means connecting at least one of said load circuit controlling means to said movable contactors associated with a corresponding selector switch in each set of selector switches whereby when said load circuit controlling means is rendered operative a circuit is completed from said discharge device to another selector switch, and means to transfer conduction in a sequential manner and at a predetermined rate from one cathode to another in one of said valves.

4. A sequence control system as defined in claim 3 wherein said plurality of load circuit controlling means comprises a first pair of electromagnetic relays, one of said pair of relays provided with contactors which when closed energizes the other relay of said pair, said other of said pair provided with contactors which when closed conditions an electromagnetic relay of a second pair for energization in response to a succeeding conduction of said discharge device.

5. A sequence control system as defined in claim 3 wherein the means coupling said discharge device to said sets of selector switches comprise a conductor connected to the selector of one of said selector switches and a normally closed contactor therein and a normally opened contactor in a conductor connected to the selector of another of said selector switches.

6. A sequence control system as defined in claim 3 wherein means is provided for impressing an initiating signal on the control element of said discharge device.

7. A timing system comprising a first counting means, a second counting means, means for selectively causing either said first or said second counting means to count to predetermined numbers at a predetermined rate, and means for causing said first counting means to count at a different predetermined rate when said second counting means is counting at said first predetermined rate.

8. A timing system comprising a first multi-cathode electric valve, a second multi-cathode electric valve, means for selectively transferring conduction from one cathode to another in a sequential manner and at a predetermined rate in either said first valve or said second valve, and means effective upon conduction at a selected cathode in said second valve to transfer conduction from a conducting cathode in said first valve to a succeeding cathode.

9. A timing system comprising a first multi-cathode electric valve, a second multi-cathode electric valve, means for selectively transferring conduction in a sequential manner and at a predetermined rate from one cathode to another in either said first valve or in said second valve, means for initiating conduction at selected cathodes in said first and second valves, and means responsive to conduction at a second selected cathode in said second valve when said first-mentioned means is transferring conduction from one cathode to another thereof to transfer conduction from one cathode to another in said first valve.

10. A timing system comprising a first multi-cathode electric valve, a second multi-cathode electric valve, means for selectively transferring conduction in a sequential manner and at a predetermined rate from one cathode to another in said first valve or in said second valve, means including multi-contact switches for initiating conduction at a selected cathode in said first valve and at a selected cathode in said second valve, means responsive to conduction at a second selected cathode in said second valve when said first-mentioned means is transferring conduction from one cathode to another thereof to control a load circuit and to transfer conduction from one cathode to another in said first valve.

11. A timing system comprising a first multi-cathode electric valve, a second multi-cathode electric valve, an electric discharge device responsive to conduction at a selected cathode in said first valve, means including a first plurality of multi-contact switches coupling the output of said discharge device to the cathodes of said first valve, a second plurality of multi-contact switches, means to transfer conduction from one cathode to another at a predetermined rate and in a sequential manner in either said first valve or said second valve, means responsive to conduction at a selected cathode in said second valve to cause conduction at a second selected cathode in said second valve and to transfer conduction from one cathode to another in said first valve and a plurality of load controlling devices operable in response to the conduction of said electric discharge device.

12. A sequence control system comprising a first multi-cathode electric valve, a second multi-cathode electric valve, means for transferring conduction from one cathode to another in a sequential manner and at a predetermined rate in either said first valve or said second valve, an electric discharge device, said electric discharge device conducting in response to conduction of a selected cathode in said first valve, means including a plurality of selector switches coupling the output of said electric discharge device to a second selected one of the cathodes in said first valve, means responsive to conduction at a selected cathode in said second valve for transferring conduction from one cathode to another in said first valve and for causing conduction at a second selected cathode in said second valve, and load circuit controlling means operable in response to conduction of said electric discharge device.

13. A sequence control system comprising a first multi-cathode electric valve, a second multi-cathode electric valve, means for transferring conduction from one cathode to another in a sequential manner and at a predetermined rate in either said first valve or said second valve, an electric discharge device, said electric discharge device conducting in response to conduction of a selected cathode in said first valve, means including a plurality of selector switches coupling the output of discharge device to a second selected one of the cathodes in said first valve, a plurality of load circuit controlling means, means coupling the output of said discharge device to said load circuit controlling means whereby they are operated in response to conduction of said discharge device, means operated by one of said load circuit controlling means to cause said first-mentioned means to transfer conduction of the cathode in said second valve, and means responsive to conduction of a selected cathode in said second valve to transfer conduction from one cathode to another in said first valve and to cause conduction at a second selected cathode in said second valve.

14. A sequence control system comprising a first multi-cathode electric valve, a second multi-cathode electric valve, means for transferring conduction from one cathode to another in a sequential manner and at a predetermined rate in either said first valve or said second valve, an electric discharge device, said electric discharge device conducting in response to conduction of a selected cathode in said first valve, means including a plurality of selector switches coupling the output of discharge device to a second selected one of the cathodes in said first valve, a plurality of load circuit controlling means, means coupling the output of said discharge device to said load circuit controlling means whereby they are operated in response to conduction of said discharge device, means operated by one of said load circuit controlling means to cause said first-mentioned means to transfer conduction of the cathode in said second valve, a first bi-stable multivibrator having an input circuit and an output circuit, means connecting said input circuit to a selected cathode of said second valve, a second bi-stable multivibrator having an input circuit and an output circuit, means coupling the output circuit of said first multivibrator to the input circuit of said second multivibrator, selector switches connecting the output circuit of said first multivibrator to the cathodes of said second valve and means coupling the output circuit of said second multivibrator to said first valve whereby said conduction is transferred from one cathode to another in said valve when second multivibrator changes its state of conduction.

15. A sequence control system as defined in claim 14 wherein said means coupling the output circuit of said first multivibrator to input circuit of said second multivibrator includes a rectifying device whereby only output signals of one polarity from said first multivibrator will be effective to change the state of conduction of said second multivibrator.

References Cited in the file of this patent

UNITED STATES PATENTS 2,813,199   Sciaky et al. ____________ Nov. 12, 1957

FOREIGN PATENTS 704,816   Great Britain ____________ Mar. 3, 1954

OTHER REFERENCES

Publ. Electronic Engineering, October 1953, pages 429–436, "An Electronic Batching Counter."

Publ. Tele-Tech. & Electronic Industries, December 1954, pages 84–86 and 153, "Glow Transfer Tubes for Counting."